(12) United States Patent
Fuqua (10) Patent No.: US 8,714,413 B2
(45) Date of Patent: May 6, 2014

(54) MOUTHWASH DISPENSER

(71) Applicant: Mary Elizabeth Coleman Fuqua, Pleasantville, NJ (US)

(72) Inventor: Mary Elizabeth Coleman Fuqua, Pleasantville, NJ (US)

( * ) Notice: Subject to any disclaimer, the term of this patent is extended or adjusted under 35 U.S.C. 154(b) by 0 days.

(21) Appl. No.: 13/859,422

(22) Filed: Apr. 9, 2013

(65) Prior Publication Data
US 2013/0221026 A1    Aug. 29, 2013

Related U.S. Application Data

(63) Continuation-in-part of application No. 13/045,069, filed on Mar. 10, 2011, now abandoned.

(60) Provisional application No. 61/312,276, filed on Mar. 10, 2010.

(51) Int. Cl.
*A47K 5/12* (2006.01)

(52) U.S. Cl.
USPC .............................. 222/367; 222/52; 222/333

(58) Field of Classification Search
USPC ........... 222/23, 52, 63, 333, 64–65, 354, 355, 222/367, 368, 332, 442, 450–452
See application file for complete search history.

(56) References Cited

U.S. PATENT DOCUMENTS

| | | | |
|---|---|---|---|
| 686,515 A | 11/1901 | Geddes | |
| 874,757 A * | 12/1907 | Fox | 222/308 |
| 1,129,002 A | 2/1915 | Nichols | |
| 1,145,221 A | 7/1915 | Tobriner | |
| 1,428,043 A | 9/1922 | Lyons | |
| 1,647,686 A | 6/1924 | Costakos | |
| 1,593,853 A | 7/1926 | Smith et al. | |
| 1,618,363 A | 2/1927 | Clark | |
| 1,942,166 A * | 1/1934 | Gisser | 241/63 |
| 2,154,283 A | 4/1939 | Reisdorf | |
| 2,469,327 A | 5/1949 | Copping | |
| 2,518,986 A | 8/1950 | Griffith et al. | |
| 3,434,629 A | 3/1969 | Hooge et al. | |
| 3,666,143 A | 5/1972 | Weston | |
| 3,693,841 A | 9/1972 | Hansen | |
| 3,765,577 A | 10/1973 | Burns, Jr. | |
| 3,813,008 A * | 5/1974 | Olson | 222/641 |
| 3,987,932 A | 10/1976 | Maldon | |
| 4,111,243 A | 9/1978 | Fetterman | |
| 4,135,542 A * | 1/1979 | Chisholm | 137/204 |
| 4,162,751 A * | 7/1979 | Hetland et al. | 222/293 |
| 4,228,923 A | 10/1980 | Barnard | |
| 4,257,538 A | 3/1981 | Fowler | |
| 4,360,130 A | 11/1982 | Nishimura et al. | |
| 4,570,823 A | 2/1986 | Arabian et al. | |
| 5,248,067 A | 9/1993 | Garcia | |
| 5,713,492 A | 2/1998 | DeGennaro | |
| 5,971,223 A | 10/1999 | Fisscher | |

(Continued)

*Primary Examiner* — Paul R Durand
*Assistant Examiner* — Donnell Long
(74) *Attorney, Agent, or Firm* — Gearhart Law, LLC (57) ABSTRACT

The present invention discloses a liquid dispenser having a body capable of attaching to an upright support surface. The body having a top wall, sidewalls, and a bottom wall, and a first orifice present in the bottom wall. The first orifice leads into an intermediary chamber said intermediary chamber having a second orifice. The second orifice may be located substantially opposite said first orifice. The intermediary chamber having an open end for admitting a control mechanism, with the control mechanism axially or reciprocally disposed within the intermediary chamber. Also present is a refill opening that is disposed along the sidewalls.

12 Claims, 12 Drawing Sheets

(56) References Cited

U.S. PATENT DOCUMENTS

| | | | |
|---|---|---|---|
| 6,059,147 A * | 5/2000 | Yuen et al. | 222/181.3 |
| 6,086,856 A | 7/2000 | Saferstein et al. | |
| 6,758,372 B2 | 7/2004 | Studer et al. | |
| 6,805,262 B1 | 10/2004 | Frazier | |
| 6,814,261 B1 | 11/2004 | Gebrayel | |
| 7,086,567 B1 * | 8/2006 | Ciavarella et al. | 222/95 |
| 7,100,801 B2 | 9/2006 | Brown et al. | |
| 7,651,015 B2 * | 1/2010 | Girard et al. | 222/509 |
| 7,753,232 B2 | 7/2010 | Keyes et al. | |
| 7,806,294 B2 | 10/2010 | Gatipon et al. | |
| 7,971,754 B2 | 7/2011 | Kadyk | |
| 8,109,411 B2 * | 2/2012 | Yang et al. | 222/52 |
| 2001/0035426 A1 | 11/2001 | Chamorro | |
| 2003/0127470 A1 | 7/2003 | DeKoning et al. | |
| 2003/0168471 A1 | 9/2003 | Redman et al. | |
| 2008/0035675 A1 * | 2/2008 | Norman | 222/181.3 |
| 2010/0200610 A1 | 8/2010 | Landers et al. | |
| 2011/0315711 A1 | 12/2011 | Hecht et al. | |
| 2012/0055954 A1 | 3/2012 | Hecht | |

\* cited by examiner

MOUTHWASH DISPENSER

CLAIM OF PRIORITY

This application is a continuation-in-part application claiming priority to U.S. utility application Ser. No. 13/045,069, filed on Mar. 10, 2011 and claiming priority to U.S. Ser. No. 61/312,276 filed on Mar. 10, 2010, the contents of both applications are fully incorporated herein by reference.

FIELD OF THE INVENTION

The invention relates to a liquid dispenser and release of contents therein.

BACKGROUND OF THE INVENTION

The invention relates to a dispenser for fluid or moderately viscous substances, such as mouthwash, sanitizer or liquid soaps and detergents. The invention contains an easily operated control mechanism for dispensing liquids. Furthermore, the invention may be rapidly refilled without messy overruns and spillovers. The present invention affords the benefits of easy and secure affixation to a support surface. The disclosed dispenser is just as easily sealed once the refill procedure is completed.

The liquids within the disclosed dispenser can be emitted at will through a choke or release mechanism. The choke mechanism relies on a shank to limit or cut off the outflow of a liquid from the dispenser. The shank may be rotated or moved reciprocally within an intermediary chamber, to vary the flow velocity of the liquid being dispensed in and outward direction. When the choke mechanism is open the liquids stored within the present invention are propelled through the apertures and hollow channel of the shank by the force of gravity.

DESCRIPTION OF THE RELATED ART

U.S. Pat. No. 2,518,886 discloses a dispenser for salmon eggs having a head, having a cylindrical securing portion, a barrel positioned at the outer end of and transversely to said portion, one end portion of the barrel being cylindrical and the other end portion forming a trough merging into upwardly diverging walls with said cylindrical securing portion, said trough having a discharge opening—at its outer end, and a plunger reciprocally mounted in the barrel and normally positioned in the trough with one end closing the discharge opening, said plunger having means for actuating the same to move said end from the opening into the trough behind the product therein for discharging the same from said opening.

U.S. Pat. No. 4,360,130 discloses a wall-mounted dispenser for liquid soap has a separable reservoir with an outlet valve. The dispenser further includes a main body with a second outlet valve. When the reservoir is mounted to the main body, a metering chamber is defined between the two outlet valves. The dispensing function is experienced by pushing in a plunger which temporarily decreases the chamber volume and forces the main body outlet valve to open temporarily, thus dispensing a charge of liquid soap. As the plunger is released, a spring return pushes the plunger out, decreasing pressure in the metering chamber, which is equalized as the first outlet valve temporarily opens, admitting a next charge of liquid soap from the reservoir to the metering chamber. The reservoir is replaced by pushing in a resilient release, but the resilient release is preferably normally provided with a stop which must first be moved out of the way. This is to prevent the user from accidentally disconnecting the reservoir when what is really wanted is a dispensation of soap. Should the reservoir be disconnected, pushing in and releasing the plunger will not result in the first outlet valve to open, because pressure will not be lowered in the metering chamber when the plunger is released.

U.S. Pat. No. 7,100,801 teaches a method of facilitating replacement of a supply of air freshener every time a supply of soap is replaced, including the steps of providing a supply of air freshener, providing a supply of soap and joining the supply of soap and the supply of air freshener. Another aspect of the invention is a method of packaging a supply unit including providing a supply of soap and a supply of air freshener and connecting the supply of soap and the supply of air freshener in a manner such that when the supply of soap is removed from a dispenser, the supply of air freshener is removed from the dispenser as well. Another aspect is a supply unit for the dual dispenser including a receptacle, a supply of soap within the receptacle, and a supply of air freshener connected to or secured within the receptacle. Yet another aspect of the invention is a dual dispenser including means for dispensing the soap, means for actuating the dispensement of soap, means for accelerating the dispensement of air freshener and means for actuating the means for accelerating the dispensement of air freshener.

Various implements are known in the art, but fail to address all of the problems solved by the invention described herein. One embodiment of this invention is illustrated in the accompanying drawings and will be described in more detail herein below.

SUMMARY OF THE INVENTION

The present invention relates to a liquid dispenser for dispensing a predetermined quantity of liquid.

In a preferred embodiment, the liquid dispenser has an inner dispensing chamber that is a hollow cylinder having one closed end and a one open end. The inner dispensing chamber may also have an inner inlet orifice, preferably located on a wall of the hollow cylinder, and an inner outlet orifice, also located on a wall of the cylinder.

The liquid dispenser may also have an outer dispensing chamber. The outer dispensing chamber may, for instance, be a hollow cylinder that is sized and shaped to rotatably fit over the inner dispensing chamber. The outer dispensing chamber may also have one closed end and one open end. The outer dispensing chamber may also have an outer inlet orifice that may, for instance, be located on the wall of the hollow cylinder, and an outer outlet orifice, also located on the wall of the hollow cylinder.

In a preferred embodiment, the inner dispensing chamber may be located within the outer dispensing chamber, with the open end of the inner dispensing chamber being positioned proximate to the closed end of the outer dispensing chamber, so as to form a sealed container having a predetermined volume.

The inner dispensing chamber is preferably rotatably adjustable between at least two positions.

In a first position, the inner dispensing chamber and the outer dispensing chamber may be oriented with respect to each other so that the inner inlet orifice of the inner dispensing chamber is sufficiently aligned with the outer inlet orifice of the outer dispensing chamber to allow fluid to flow under gravity from outside the outer dispensing chamber into the hollow cylinder of the inner dispensing chamber.

At the same time, in the first position, the inner outlet orifice of the inner dispensing chamber may be sufficiently out of alignment with the outer outlet orifice of the outer dispensing chamber that no fluid flows through either of the outlet orifices.

In this way, in the first position, the inner dispensing chamber may fill with a quantity of liquid substantially equal to the volume of the hollow cylinder of the inner dispensing chamber.

In a second position, the inner outlet orifice of the inner dispensing chamber and the outer outlet orifice of the outer dispensing chamber may be sufficiently aligned to allow fluid to flow under gravity from the hollow cylinder of the inner dispensing chamber, to outside the outer dispensing chamber. At the same time, in the second position, the inner inlet orifice of the inner dispensing chamber may be sufficiently out of alignment with the outer inlet orifice that substantially no fluid flows through either of the inlet orifices.

In a further, preferred embodiment, the liquid dispenser includes at least one fluid sealing element located between the inner dispensing chamber and the outer dispensing chamber. The liquid dispenser may have a liquid reservoir located above the inner dispensing chamber and may also include a level sensor degrees and a check valve.

In a further, preferred embodiment, the liquid dispenser may be designed so that activating an electrical switch such as, but not limited to, activating a rotary solenoid, dispenses a predetermined measure of the liquid by changing the orientation of the inner dispensing chamber with respect to the outer dispensing chamber from the first position to the second position.

In a further, preferred embodiment, the liquid dispenser includes a lock mechanism controlling the accessibility to the liquid in the reservoir. When the lock is properly locked, the lid cannot be opened, preventing access to the reservoir.

In a further, preferred embodiment, the liquid dispenser includes an optical sensor that that may activate a processor board, wherein the processor board sends out signals for the rotation of chambers and release of liquids.

Therefore, the present invention succeeds in conferring the following, and others not mentioned, desirable and useful benefits and objectives.

It is an object of the present invention to provide a reliable and easy to use dispenser for common sanitizing and cleaning solutions or liquids.

It is another object of the present invention to provide a dispenser that easily dispenses liquids stored within.

Yet another object of the present invention is to provide a closing mechanism that is hermetical, but does not require a significant force to actuate.

Still another object of the present invention is to provide a liquid release mechanism or control mechanism that may move in multiple directions while controlling the outflow of liquids.

Still another object of the present invention is to provide a liquid dispenser having a splash guard.

Yet another object of the present invention is to provide a dispenser that can be easily and rapidly refilled, while limiting messy spillovers.

Still another object of the present invention is to provide a dispenser having a level indicator, so that the stored liquid may be replenished before it completely runs out.

DESCRIPTION OF THE PREFERRED EMBODIMENTS

The preferred embodiments of the present invention will now be described with reference to the drawings. Identical elements in the various figures are identified with the same reference numerals.

Reference will now be made in detail to embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Figure 1:
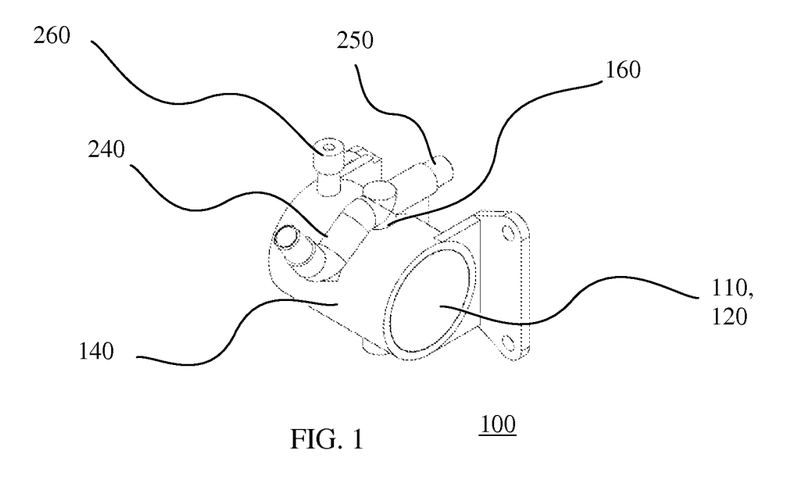
FIG. 1 shows an isometric view of the liquid dispenser of a first preferred embodiment of the present invention.

FIG. 1 shows an isometric view of the liquid dispenser of a first preferred embodiment of the present invention.

The liquid dispenser 100 may have inner dispensing chamber 110 that has one closed end 120. The liquid dispenser 100 may also have an outer dispensing chamber 140 into which the inner dispensing chamber 110.

As seen in FIG. 1, the liquid dispenser 100 may have an outer inlet orifice 160 in the outer dispensing chamber 140. The outer inlet orifice 160 may be connected by a straight tube 250 to a measuring device such as, but not limited to, a level sensor 220 (not shown in FIG. 1). The outer inlet orifice 160 may also be connected via a U shaped tube 240 to a liquid reservoir 230 (not shown in FIG. 1). The liquid dispenser 100 may also include a check valve 260 that may facilitate easy filing and draining of the inner dispensing chamber 110 by allowing air to enter and exit the inner dispensing chamber 110.

Figure 2:
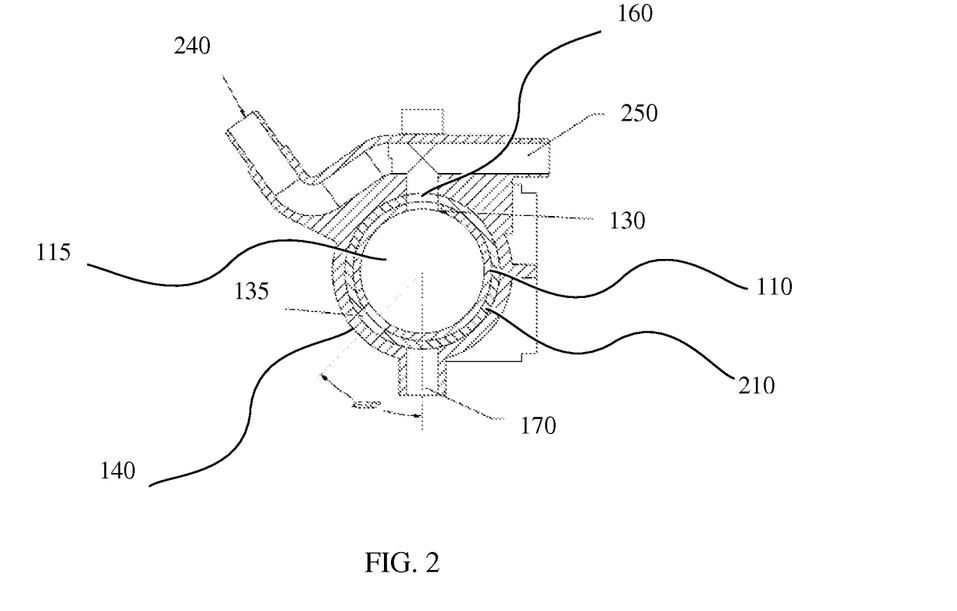
FIG. 2 shows a cross-sectional view of the liquid dispenser of the first preferred embodiment of the present invention.

FIG. 2 shows a cross-sectional view of the liquid dispenser of the first preferred embodiment of the present invention.

The liquid dispenser 100 may have an inner dispensing chamber 110. In a preferred embodiment, the inner dispensing chamber 110 may be a hollow cylinder 115 having one closed end 120 and one open end 125. The inner dispensing chamber 110 may also have an inner inlet orifice 130 located on a wall of the hollow cylinder 115 and an inner outlet orifice 135 located on another portion of a wall of the hollow cylinder 115.

The liquid dispenser 100 may also have an outer dispensing chamber 140 that is also a hollow cylinder 155 and which is sized and shaped to close but rotatable fit over the inner dispensing chamber 110. The outer dispensing chamber 140 may also have one closed end 150 and one open end 165. In a preferred embodiment, the inner dispensing chamber 110 may be located within the outer dispensing chamber 140 with the open end 125 of the inner dispensing chamber 110 being positioned proximate to the closed end 150 of the outer dispensing chamber 140. In that way, a sealed off volume of a predetermined capacity may be created.

The outer dispensing chamber 140 may also include an outer inlet orifice 160 that may be located on a wall of the hollow cylinder 155 and an outer outlet orifice 170 may be located on a different portion of a wall of the hollow cylinder 155.

The inner dispensing chamber 110 may be rotatably adjustable between a first position and a second position.

In the first position, shown in FIG. 2, the inner inlet orifice 130 of the inner dispensing chamber 110 and the outer inlet orifice 160 of the outer dispensing chamber 140 may be sufficiently aligned to allow fluid to flow, under gravity, from outside the outer dispensing chamber 140 into the hollow cylinder 115 of the inner dispensing chamber 110.

Moreover, in the first position, shown in FIG. 1, the inner outlet orifice 135 of the 140 may be sufficiently out of alignment with the outer outlet orifice 170 of the outer dispensing chamber 140. In this way, substantially no fluid flows through either of the outlet orifices.

By rotating the inner dispensing chamber 110 shown in FIG. 2 by an angle of 45 degrees counter clockwise, a second position or alignment of the closed end inner dispensing chamber 110 with respect to the outer dispensing chamber 140 may be obtained. In this second position or alignment, the inner outlet orifice 135 of the inner dispensing chamber 110 may now be sufficiently aligned with the outer outlet orifice 170 of the outer dispensing chamber 140 to allow fluid to flow under gravity from the hollow cylinder 115 of the inner dispensing chamber 110, to outside of said outer dispensing chamber 140.

Moreover, in this second position, the inner inlet orifice 130 of the inner dispensing chamber 110 is no longer in alignment with the outer inlet orifice 160 of the outer dispensing chamber 140. In this position, substantially no fluid flows through either of the inlet orifices, so that the volume dispensed is substantially equal to the capacity of the hollow cylinder 115 of the inner dispensing chamber 110.

One of ordinary skill in the art will readily appreciate that although the inlet and outlet orifices of the inner dispensing chamber 110 are show as being aligned at an angle of 134 degrees with respect to each other, while the inlet and outlet orifice of the outer dispensing chamber 140 are aligned at 180 degrees with respect to each other, the liquid dispenser 100 could be made with a variety of different alignments, so long as the rotation of the inner dispensing chamber 110 was adjusted to conform to the alignments.

The inner inlet orifice and inner inner outlet orifice may, for instance, be offset from each other by an angle in a range of 110 degrees to 160 degrees.

In a preferred embodiment, the liquid dispenser 100 may include at least one fluid sealing element 210 located between the inner dispensing chamber 110 and the outer dispensing chamber 140. The fluid sealing element 210 may, for instance, be of a gasket type such as, but not limited to, an o-ring. There may, for instance, be at least two fluid sealing element 210, located between the orifices and the closed end 120 of the inner dispensing chamber 110, and one between the orifices and the closed end 150 of the outer dispensing chamber 140.

Also shown in FIG. 2 is the U shaped tube 240 that may provide a fluid connection between the outer inlet orifice 160 and a liquid reservoir 230 (not shown in FIG. 2).

There is also the straight tube 250 that may connect the outer inlet orifice 160 to a sensor such as, but not limited to, a level sensor 220.

Figure 3:
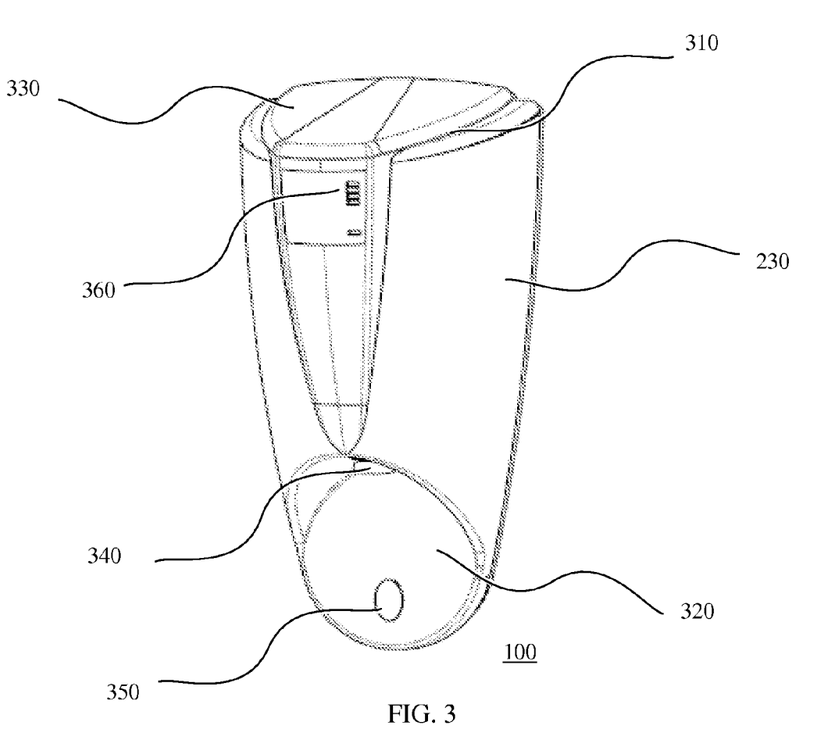
FIG. 3 shows an isometric view of the first preferred embodiment of the liquid dispenser of the present invention.

FIG. 3 shows an isometric view of the first preferred embodiment of the liquid dispenser of the present invention.

In FIG. 3, the outside of a liquid reservoir 230 is shown. The liquid reservoir 230 may have a refill lid 330, shown closed in FIG. 3 and covering the refill opening 310.

The liquid dispenser 100 may also have an outlet spout 340 from which the fluid may be dispensed and a splash guard 320 to prevent damage to a wall the liquid dispenser 100 may be mounted on. The may also be an attachment opening 350 in the splash guard 320 as part of a means to fix the liquid dispenser 100 to a wall or other surface.

Figure 4:
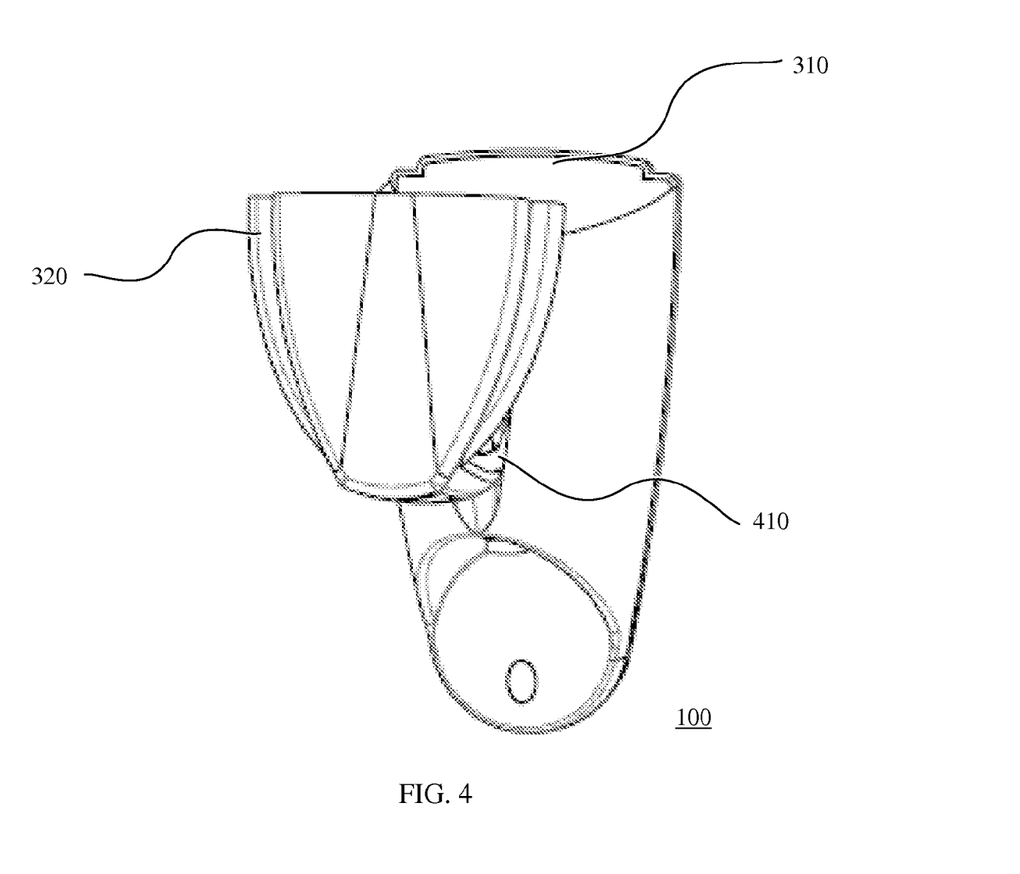
FIG. 4 shows an isometric view of the first preferred embodiment of the liquid dispenser of the present invention with a refill lid in an open position.

The liquid dispenser 100 is preferably between 2 inches and 1 foot in height, between 1 inch and 6 inches in width 13, and between 1 inch and 6 inches in depth 14 (FIG. 4). The liquid dispenser 10 may preferably hold at least 2 ounces of a liquid internally. Preferably, the liquid dispenser may be easily disassembled for cleaning, storing, transporting or repair. The liquid dispenser 10 may receive an infusion of liquid through the refill opening 150, or the liquid may reside in a disposable pack that may be inserted into the dispenser 10.

FIG. 4 shows an isometric view of the first preferred embodiment of the liquid dispenser of the present invention with a refill lid in an open position.

The refill lid 330 has been rotated outward via hinge unit 410 so as to reveal the refill opening 310.

In an alternate embodiment, the liquid reservoir 230 may be configured to accommodate an interchangeable package containing the liquid to be dispensed.

Figure 5:
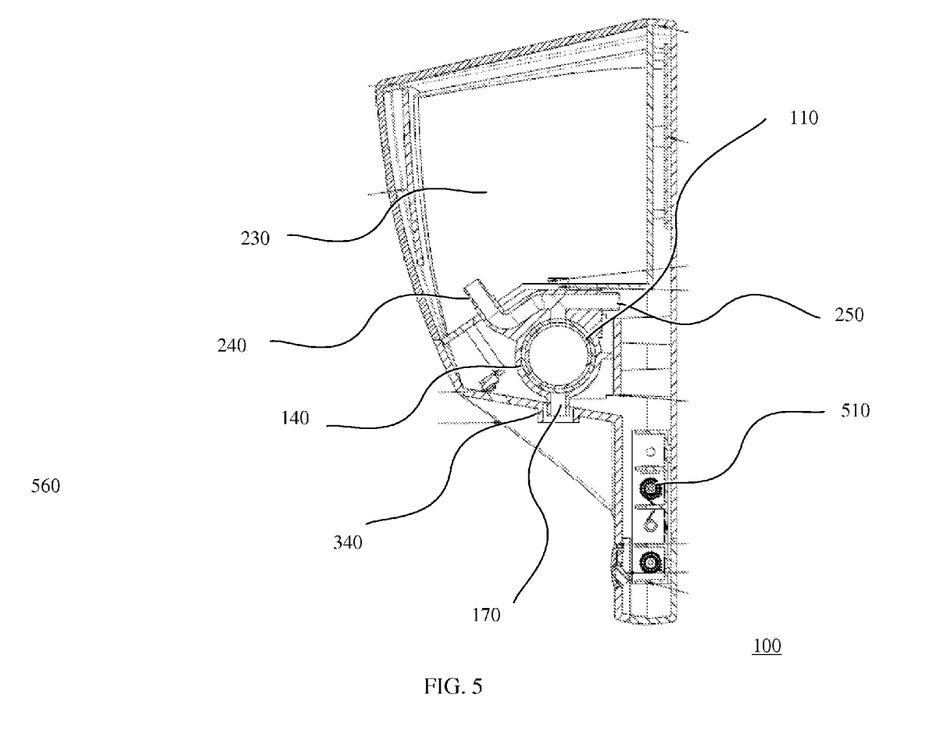
FIG. 5 shows a cross-sectional view of the first preferred embodiment of the liquid dispenser of the present invention.

FIG. 5 shows a cross-sectional view of the first preferred embodiment of the liquid dispenser of the present invention.

In this view the inner dispensing chamber 110 and the outer dispensing chamber 140 may be seen in position beneath the liquid reservoir 230. Therefore the Examiner's rejection is respectfully traversed outer outlet orifice 170 may also be seen in alignment with the outlet spout 340. The U shaped tube 240 that may connect the liquid reservoir 230 to the outer outlet orifice 170 is shown, along with the straight tube 250 that may connect the outer outlet orifice 170 to a sensor such as, but not limited to, a level sensor 220 that may senses the level of liquid in the liquid reservoir 230.

The electrical control box 510 may house components such as, but not limited to, a level sensor 220, a processor board 640, a primary level sensor 620, a battery level monitor 690 and a battery 710 or some combination thereof.

FIGS. 6-9 and 11-12 show the structures and design of two more preferred embodiments of the present invention. It should be noted that since some structures are shared by the various embodiments, the descriptions for such structures are not fully repeated. The detailed description for one component in the first preferred embodiment may be considered included for the same component in the other embodiments, unless there is a direct conflict provided for the component.

Figure 6:
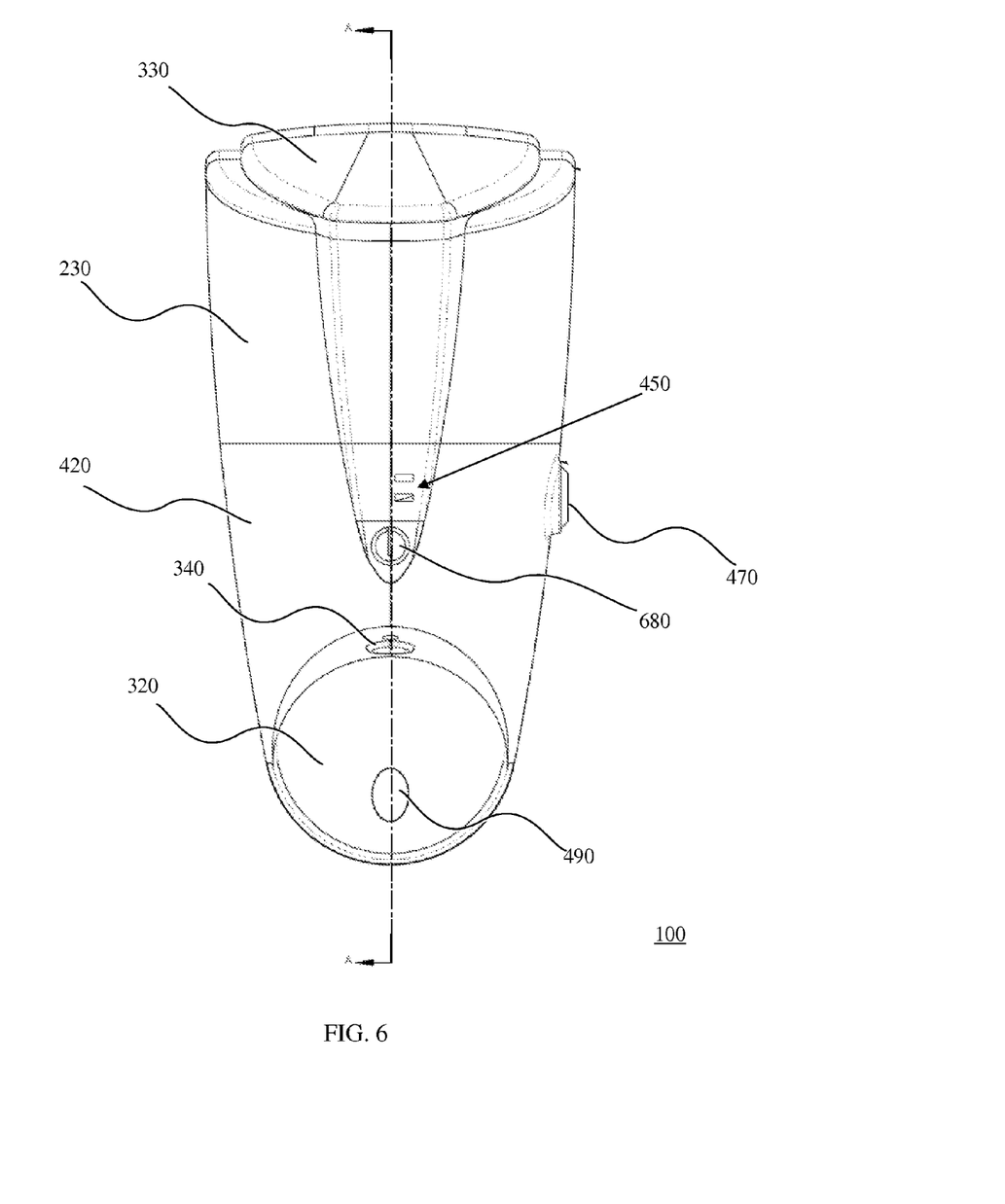
FIG. 6 shows a front view of a liquid dispenser of a second preferred embodiment of the present invention.

FIG. 6 shows a front view of a liquid dispenser of a second preferred embodiment of the present invention.

Shown in FIG. 6 is the outside of the liquid dispenser 100, which may have a reservoir 230 positioned above a lower portion covered by a lower portion housing 420. The liquid reservoir 230 may have a refill lid 330, shown closed in FIG.

6. The liquid dispenser 100 may also have an outlet spout 340 from which the fluid may be dispensed and a splash guard 320 to prevent damage to a wall the liquid dispenser 100 may be mounted on. The may also be a lens 490 attached to the splash guard 320. The liquid dispenser 100 may also include an on/off switch 680 that can control power supply to the dispenser. FIG. 6 also shows indicators 450 and a lock 430.

Figure 7:
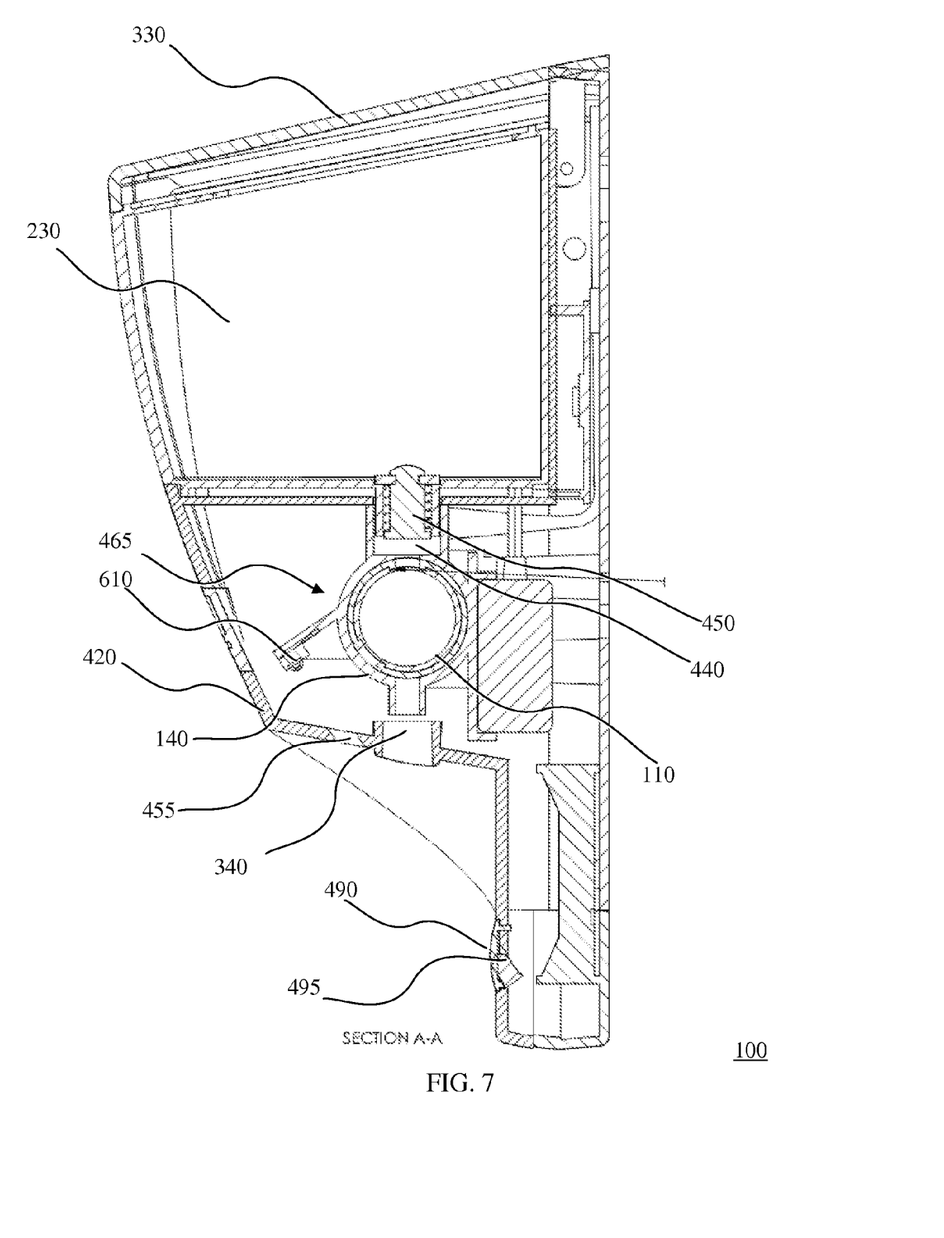
FIG. 7 shows a sectional view of the liquid dispenser of the second preferred embodiment of the present invention.

FIG. 7 shows a sectional view of the liquid dispenser of the second preferred embodiment of the present invention.

The apparent difference between the second embodiment and the first embodiment (see FIG. 5) is that the reservoir 230 in the second embodiment is a distinct and separable structure. In the second embodiment shown in FIG. 7, the reservoir 230 is positioned on a lower portion of the dispenser covered by a lower portion housing 420. In this view, the chamber assembly 465, which includes the inner dispensing chamber 110 and the outer dispensing chamber 140, may be seen in position beneath the liquid reservoir 230 and fluidly connected to the liquid reservoir through a tube 440 and valve 445. The outer outlet orifice 170 may also be seen in alignment with the outlet spout 340.

Figure 9:
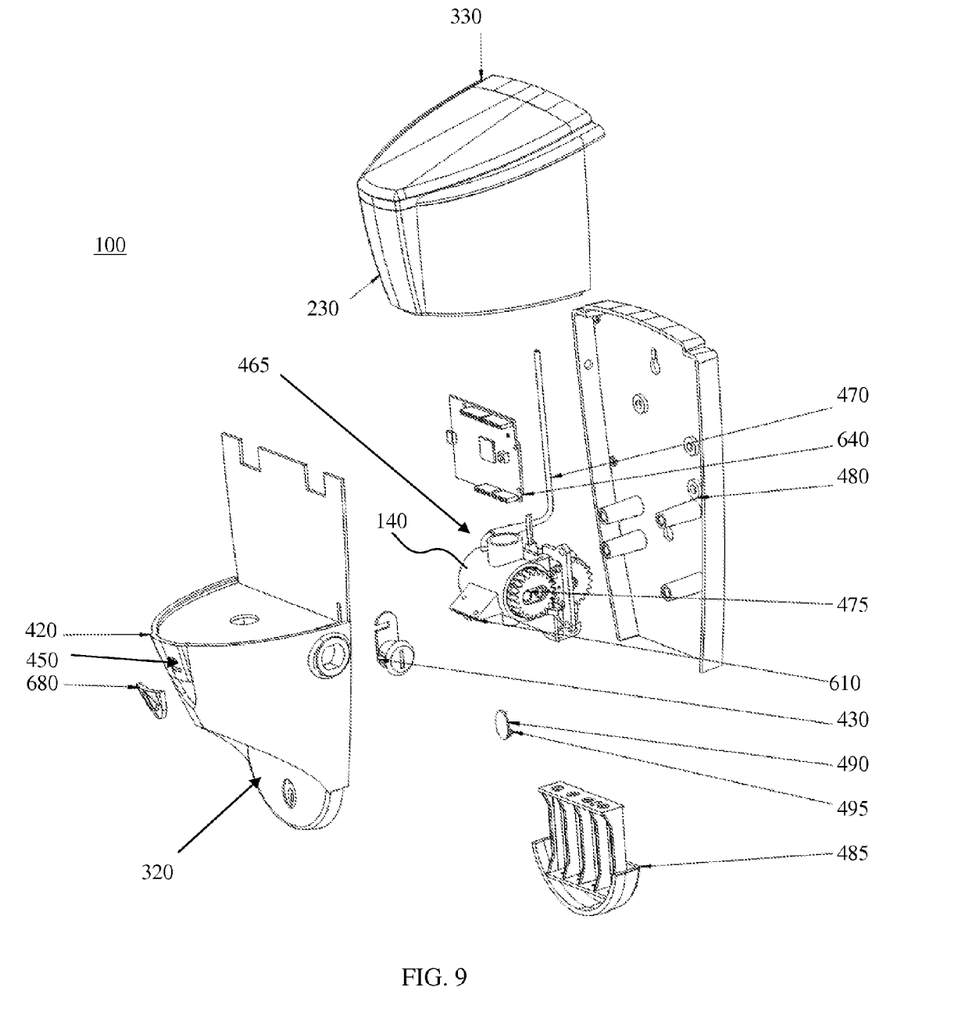
FIG. 9 shows an isometric exploded view of the liquid dispenser of the second preferred embodiment of the present invention, illustrating the various components.

Attached to the outer chamber 140 is an optical receiver 610 positioned against a through hole 455 on the lower portion housing 420. Light generated by an emitter 495 passes through a lens 490 may be received by the optical receiver 610. As shown in FIG. 9, the lens 490 and emitter 495 may attach to the splash guard 320. Movement of objects beneath the through hole 455 may be detected by the optical receiver 610 and signals may be sent to trigger actions such as the dispensing of liquid.

Figure 8:
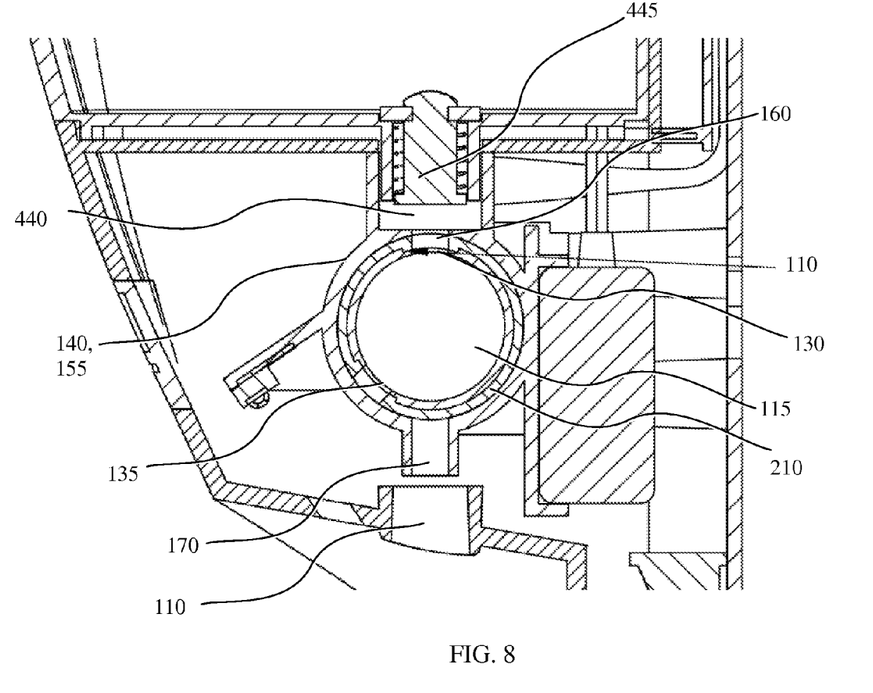
FIG. 8 shows a sectional view of the liquid dispenser of the second preferred embodiment of the present invention, providing details for the dispensing chambers.

FIG. 8 shows a sectional view of the liquid dispenser of the second preferred embodiment of the present invention, providing details for the dispensing chambers.

In a large part, the dispensing chambers of the second embodiment are similar to the dispensing chamber of the first embodiment, as shown in FIG. 2. The liquid dispenser 100 may have an inner dispensing chamber 110, which may be a hollow cylinder 115 having one closed end 120 and one open end 125 (not shown in FIG. 8). The inner dispensing chamber 110 may also have an inner inlet orifice 130 located on a wall of the hollow cylinder 115 and an inner outlet orifice 135 located on another portion of a wall of the hollow cylinder 115.

The liquid dispenser 100 may also have an outer dispensing chamber 140 that is also a hollow cylinder 155 and which is sized and shaped to close but rotatable fit over the inner dispensing chamber 110. The outer dispensing chamber 140 may also have one closed end 150 and one open end 165 (not shown in FIG. 8). In a preferred embodiment, the inner dispensing chamber 110 may be located within the outer dispensing chamber 140 with the open end 125 of the inner dispensing chamber 110 being positioned proximate to the closed end 150 of the outer dispensing chamber 140. In that way, a sealed off volume of a predetermined capacity may be created. The outer dispensing chamber 140 may also include an outer inlet orifice 160 that may be located on a wall of the hollow cylinder 155 and an outer outlet orifice 170 may be located on a different portion of a wall of the hollow cylinder 155.

The inner dispensing chamber 110 may be rotatably adjustable between a first position and a second position. Switching between the first position and the second position results in the switch between a first state wherein liquid flows from the reservoir 230 to the hollow cylinder 115 and a second state wherein liquid flows from the hollow cylinder 115 to the outer outlet orifice 170. The details of the transition are described for FIG. 2.

In a preferred embodiment, the liquid dispenser 100 may include at least one fluid sealing element 210 located between the inner dispensing chamber 110 and the outer dispensing chamber 140. In addition to the descriptions for FIG. 2, the fluid sealing element 210 may also be a cylinder having two holes that are aligned with the inlet and outlet orifices of the inner dispensing chamber 110. The fluid sealing element 210 rotates with the dispensing chamber 110 relative to the outer chamber 140, providing a sealing between the two chambers.

Also shown in FIG. 8 are the tube 440 and valve 445 that may provide a fluid connection between the outer inlet orifice 160 and a liquid reservoir 230. The valve 445 is a mechanism that can only be opened when the reservoir 230 is properly placed on the lower portion of the dispenser 110.

FIG. 9 shows an isometric exploded view of the liquid dispenser of the second preferred embodiment of the present invention, illustrating the various components.

Shown in FIG. 9 is the liquid dispenser 100 having a reservoir 230 that may be positioned above a lower portion covered by a lower portion housing 420. The liquid reservoir 230 may have a refill lid 330, shown closed in FIG. 9 and covering a refill opening. Attached to the lower portion housing 420, there may be an on/off button 680 and a series of indicators 450. The liquid dispenser 100 may also have a chamber assembly 465, including the inner chamber 110 (not shown in FIG. 9), the outer chamber 140, a venting tube 470, a motor assembly 475, a battery housing 485, a lens 490 and an emitter 495. Attached to the chamber assembly 465 is an optical receiver 610. Also shown in FIG. 9 are a splash guard 320, a lock 430, a rear base 480, and a processor board 640. The venting tube 470, as shown in FIG. 9, preferably extends from the inner chamber 110 upwards fluidly connects to ambient air, balancing the pressure in the inner chamber 110. The rear base 480 allows the dispenser to be securely attached to a vertical surface, such as a wall. The lower portion housing 420 is mounted on the rear base 480, forming a void in which the chamber assembly 465 can be accommodated. The lock 430 locks the refill lid 330 of the reservoir 230. In the second embodiment, preferably the lid 330 is hingedly attached to the reservoir 230. With the lock 430 in place, the refill lid 330 cannot be opened, preventing access to the interior of the reservoir. The battery housing 485 may be used to accommodate batteries, the power source for the dispenser.

Figure 10:
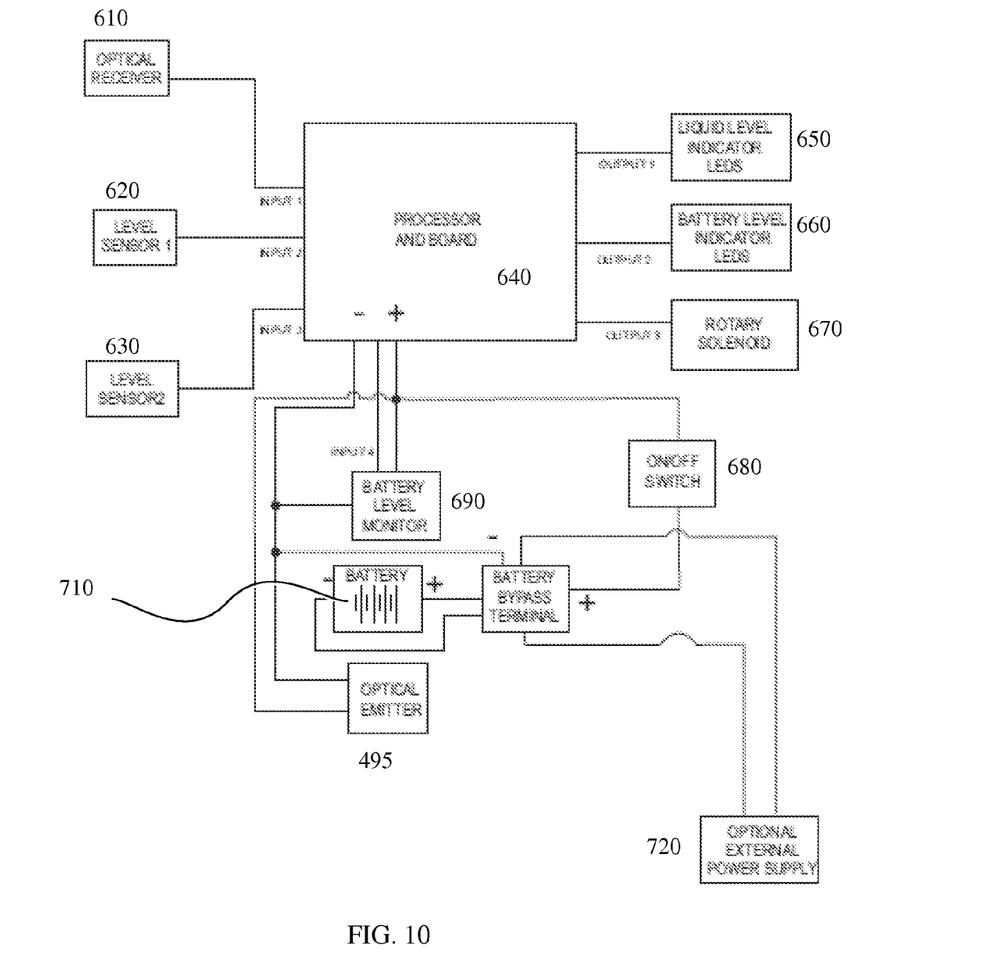
FIG. 10 shows a schematic block diagram of the electrical control circuit of a liquid dispenser of the present invention.

The first and second embodiments are preferred to be automatic, or at least partially automatic. FIG. 10 shows a schematic block diagram of the electrical control circuit of the preferred embodiments of the present invention.

The liquid dispenser 100 may have a processor board 640 that may be activated using a suitable optical receiver 610. The processor board 640 may receive inputs from sensors such as, but not limited to, a primary level sensor 620, a back up level sensor 630, a battery level monitor 690 and a on/off switch 680 or some combination thereof.

The processor board 640 may use these inputs to control the liquid dispenser 100 and to provide information to a user by displays such as, but not limited to, a liquid level indicator 650 and a battery level indicator 660. The processor board 640 may, for instance, be also activate a rotary solenoid 670 in order to dispense liquid after receiving an input signal via, for instance, the optical receiver 610.

Activation of the optical receiver 610 may, for instance, change the orientation of the inner dispensing chamber with respect to the outer dispensing chamber from a first, filling position to a second, dispensing position.

Figure 11:
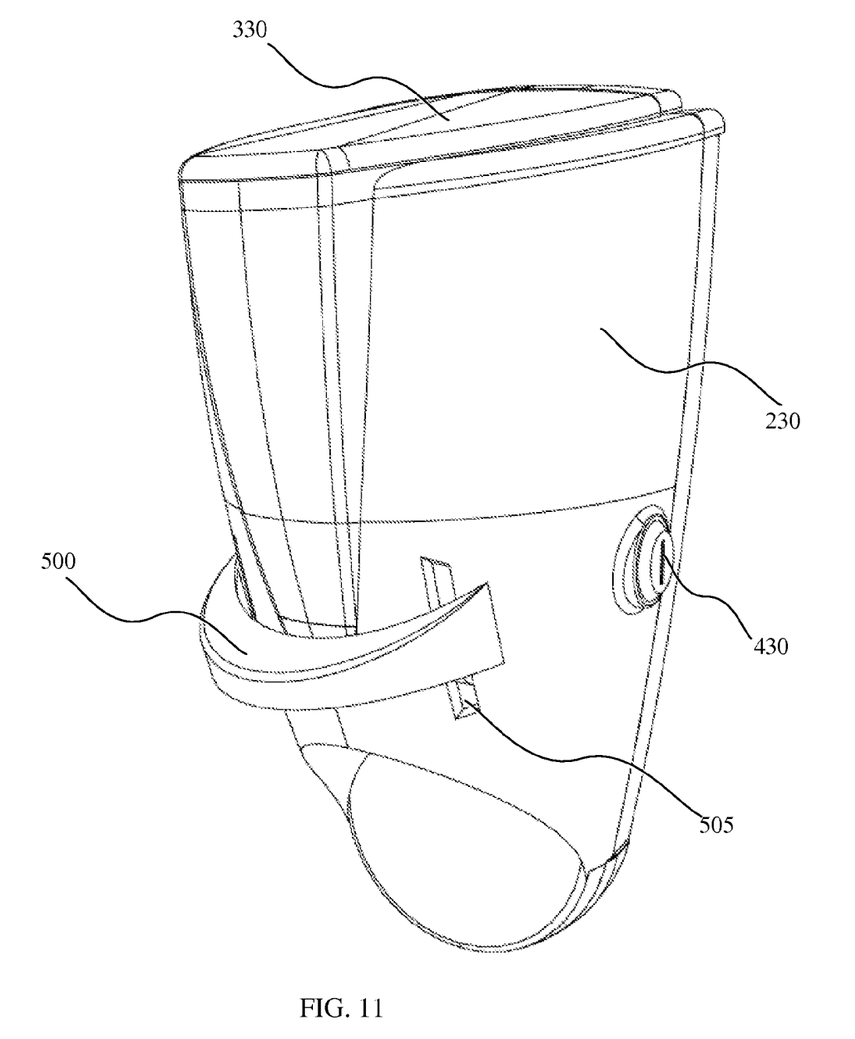
FIG. 11 shows an isometric view of the liquid dispenser of a third preferred embodiment of the present invention.

FIG. 11 shows an isometric view of the liquid dispenser of a third preferred embodiment of the present invention. Instead of electronically controlled, the third embodiment is preferred to be manually driven.

Shown in FIG. 11 is the outside of the liquid dispenser 100, which may have a reservoir 230 positioned above a lower portion covered by a lower portion housing 420. The liquid reservoir 230 may have a refill lid 330, shown closed in FIG. 11. The liquid dispenser 100 may also have a lever 500 extending through lever holes 505. FIG. 11 also shows a lock 430.

Figure 12:
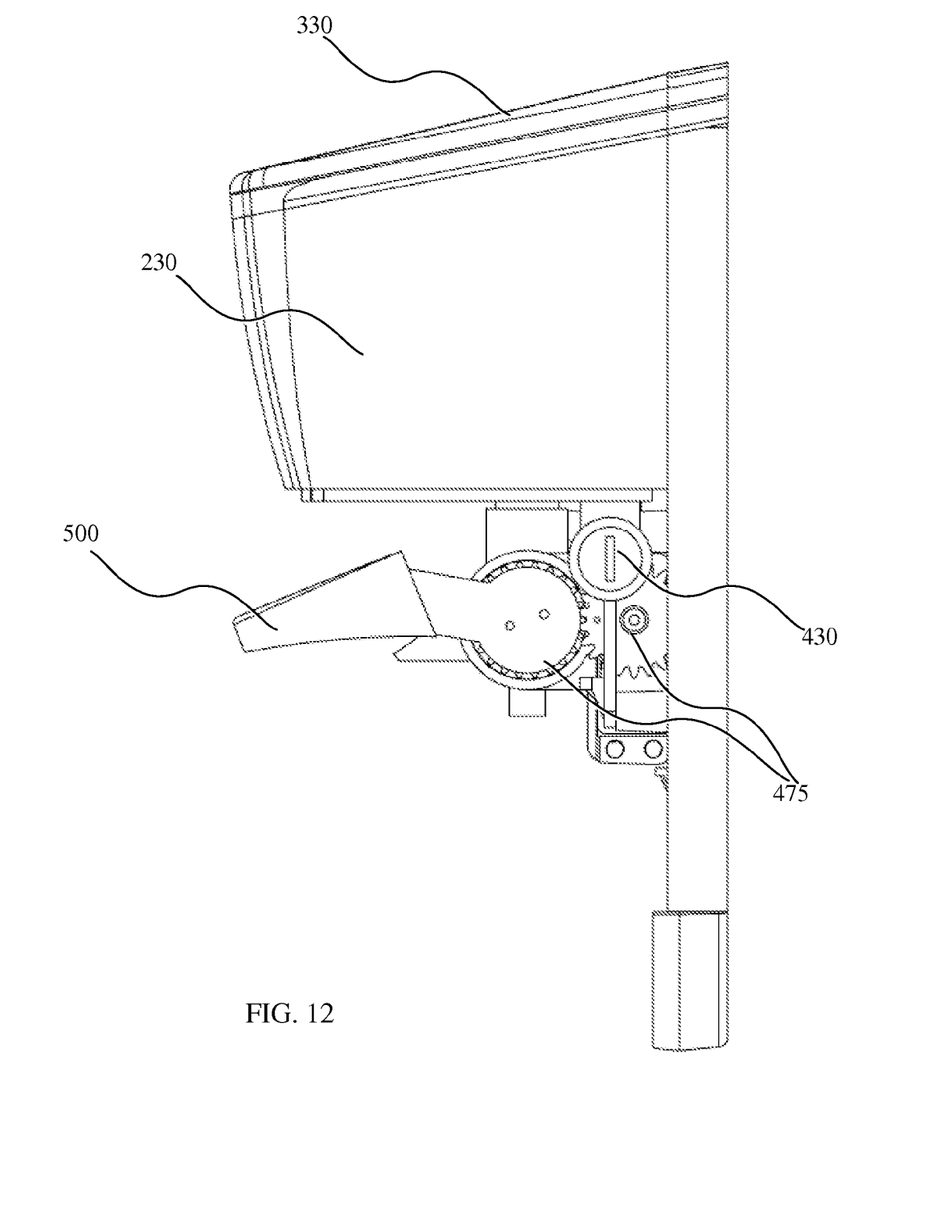
FIG. 12 shows a side view of the liquid dispenser of the third preferred embodiment of the present invention, with the lower portion housing removed.

FIG. 12 shows a side view of the liquid dispenser of the third preferred embodiment of the present invention, with the lower housing 420 removed. Shown in FIG. 12 is the liquid dispenser 100 having a reservoir 230 covered by a refill lid 330, shown closed in FIG. 12. The liquid dispenser 100 may also have a lever 500 extending attached to a motor assembly 475. FIG. 11 also shows a lock 430.

Referring to FIGS. 11 and 12, the liquid dispenser may be entirely or partially manual driven. The user may push down the lever 500 to switch the chambers (110 and 140, not shown in FIGS. 11 and 12) from the first position to the second position. The motor assembly 475 may include a spring, propelling the chambers back to the first position after the user releases the lever 500.

Some of the materials from which to manufacture any of the components of this invention may include one or more plastics and resins, including but not limited to plastic, rubber, foam, silicone, ABS, Polycarbonate, Noryl™, PVC, Polystyrene, ABS/PVC, PVC/Acrylic, Polysulfone, Acrylic, Polyethylene, Kydex™, PETG; glass, including but not limited to fiberglass, borosilicate, or quartz; wood; metals, including but not limited to iron, tin, aluminum, copper; rubber including but not limited to natural rubber, SBR, Isoprene rubber, Butadiene rubber, and Chloroprene rubber; or any combinations or composites of these or other materials.

It should be noted that the nomenclature of the elements defines the preferred embodiment. However, a different orientation of the elements may be possible. For example, the first orifice may align with the second opening, and the first opening may align with the second orifice. Similarly none of the dimensions disclosed herein are definitive, but merely describe the preferred dimensions of the various parts of the present invention.

The present invention may be used in multiple settings. It may preferably function as a dispenser of hygienic or cleansing liquids, such as, but not limited to mouthwash, soap, sanitizer or detergent. The liquids are preferably fluid to an extent that they will vigorously respond to the force of gravity. Therefore, there liquids may be propelled through the ducts and chambers of the present invention under the force of gravity. Alternatively, a spring, a press, or suction force may be implemented inside the present invention, so as to propel the dispensation of a liquid into a cup or in a general outward direction.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A liquid dispenser for dispensing a predetermined quantity of said liquid, comprising:
    a liquid reservoir having an openable refill lid that provides a substantially horizontal cover over said liquid reservoir; and
    a dispensing chamber assembly located substantially below, and in fluid contact with said liquid reservoir via a tube;
    wherein said dispensing chamber assembly comprises:
        an inner dispensing chamber comprising a hollow cylinder having a first closed end and a second open end, an inner inlet orifice located on a wall of said hollow cylinder and an inner outlet orifice located on a wall of said hollow cylinder;
        an outer dispensing chamber comprising a hollow cylinder sized and shaped to rotatably fit over said inner dispensing chamber, having a first closed end and a second open end, an outer inlet orifice located on a wall of said hollow cylinder and an outer outlet orifice located on a wall of said hollow cylinder;
        and a singular fluid sealing element located between said inner dispensing chamber and said outer dispensing chamber;
        said inner dispensing chamber being located within said outer dispensing chamber with said second open end of said inner dispensing chamber being positioned proximate to said closed end of the outer dispensing chamber; said
    inner dispensing chamber being rotatably adjustable between a first position and a second position;
        said first position comprising said inner inlet orifice and said outer inlet orifice being sufficiently aligned to allow fluid to flow, under gravity, from outside said outer dispensing chamber into said hollow cylinder of said inner dispensing chamber, and said inner outlet orifice being sufficiently out of alignment with said outer outlet orifice that substantially no fluid flows through either of said outlet orifices;
        said second position comprising said inner outlet orifice and said outer outlet orifice being sufficiently aligned to allow fluid to flow under gravity from said hollow cylinder of said inner dispensing chamber, to outside of said outer dispensing chamber, and said inner inlet orifice being sufficiently out of alignment with said outer inlet orifice that substantially no fluid flows through either of said inlet orifices,
        and said singular fluid sealing element having two holes aligned with the inlet orifice and the outlet orifice of the inner dispensing chamber, said fluid sealing element rotating with the inner dispensing chamber.

2. The liquid dispenser of claim 1 further comprising a lower portion having a lower portion housing; wherein the lower portion housing encases the dispensing chamber assembly.

3. The liquid dispenser of claim 1 further comprising a lock, said lock locking the refill lid, preventing access to the liquid reservoir.

4. The liquid dispenser of claim 1 wherein said inner inlet orifice and said inner outlet orifice are offset from each other by an angle in a range of 110 degrees to 160 degrees.

5. The liquid dispenser of claim 1 wherein said inner inlet orifice and said inner outlet orifice are offset from each other by an angle of substantially 135 degrees, while said outer inlet orifice and said outer outlet orifice are offset by an angle by and angle of substantially 180 degrees.

6. The liquid dispenser of claim 1 wherein activating a rotary solenoid having a cam or a radial armature changes the orientation of said inner dispensing chamber with respect to said outer dispensing chamber from said first position to said second position.

7. The liquid dispenser of claim 2, further comprising:
a rear base, wherein the lower portion housing is mounted on the rear base, and the rear base is mounted on a vertical surface.

8. The liquid dispenser of claim 2, further comprising:
an optical receiver, the optical receiver detects movements under the lower portion housing and triggers a transition from the first position to the second position.

9. The liquid dispenser of claim 8, wherein the optical receiver attaches to the outer dispenser chamber.

10. The liquid dispenser of claim 1, further comprising
a motor assembly, the motor assembly controls transition from the first position to the second position.

11. The liquid dispenser of claim 10, wherein
the motor assembly is controlled by a processor board.

12. The liquid dispenser of claim 10, further comprising:
a lever connected to the motor assembly, wherein
the lever extends through lever holes on the lower portion housing, and
pushing the lever switches the chamber assembly from the first position to the second position.

* * * * *